April 25, 1967  W. D. REID  3,315,612
TRANSPORTATION SYSTEM
Filed June 16, 1965
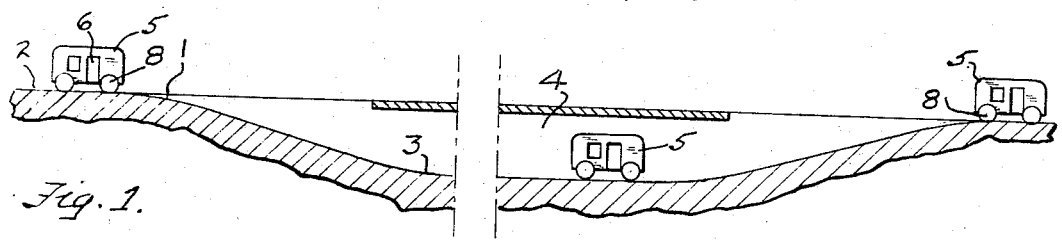
Fig. 1.
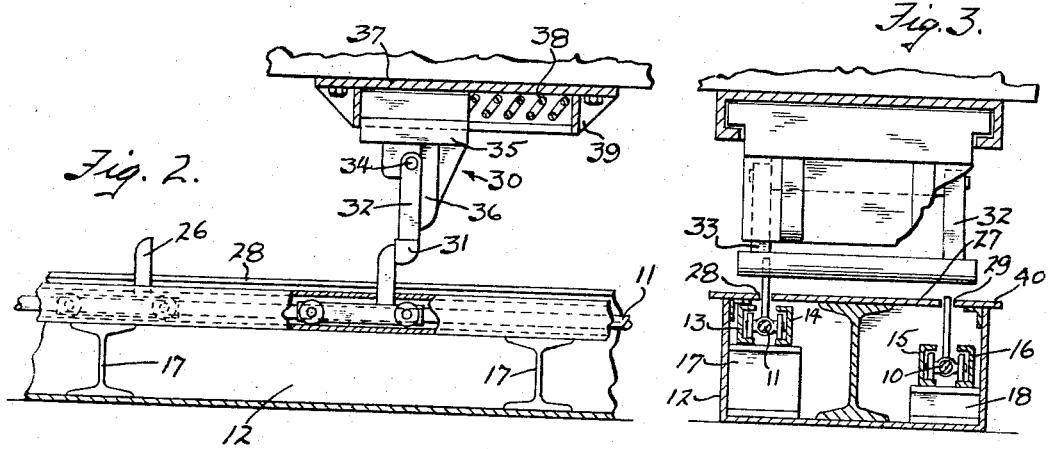
Fig. 2.  Fig. 3.
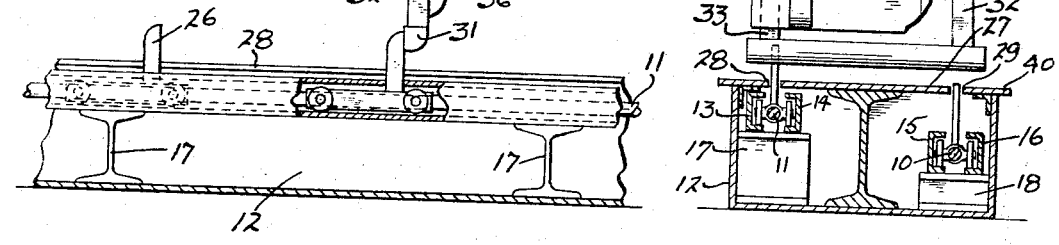
Fig. 4.
Fig. 5
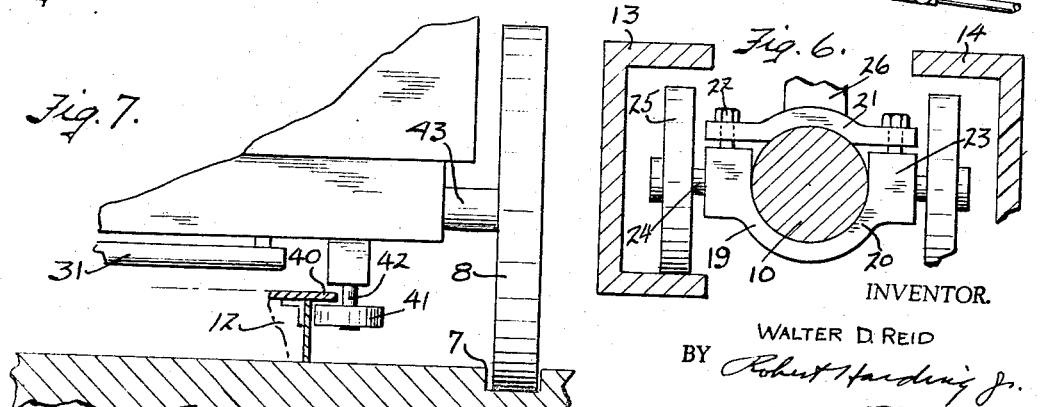
Fig. 7.  Fig. 6.
INVENTOR.
WALTER D. REID
BY *Robert Harding Jr.*
ATTORNEY 3,315,612
TRANSPORTATION SYSTEM
Walter D. Reid, Box 66, Cullowhee, N.C. 28723
Filed June 16, 1965, Ser. No. 464,354
12 Claims. (Cl. 104—25)

This invention relates to transportation systems and more particularly to transportation systems in which cars move continuously on a track, slowing to a relatively slow speed for loading and unloading purposes and moving at higher speed between points of loading and unloading.

One of the objects of the invention is to provide a transportation system of this nature which will be simple, with a minimum of moving parts, and will be inexpensive to operate and maintain.

Another object of the invention is to provide a transportation system which is particularly adapted for city use to eliminate or reduce heavy traffic in the streets.

Still another object of the invention is to provide a transportation system in which cars are propelled by continuously moving high speed and low speed driving means, common to all the cars, provision being made for automatically shifting the drive from the high speed driving means to the low speed driving means as a car approaches a station and from the low speed driving means to the high speed driving means as the car leaves a station.

Another object of the invention is to provide a transportation system with high and low speed driving means, common to all the cars, in which the speed of a car is adjusted between high and low speeds by the action of gravity as the drive is shifted from one driving means to another.

Still another object of the invention is to provide a transportation system in which the high and low speed driving means comprise continuously moving high and low speed cables.

Other objects and objects relating to the construction and assembly of the various parts will be apparent as the description of the invention proceeds.

One embodiment of the invention is illustrated in the accompanying drawings, in which:

FIGURE 1 s a diagrammatic, elevational view of the track of the system of the invention, showing the relation of the track elevation at the low speed station areas and at the high speed intervening areas;

FIGURE 2 is a side elevational view of a driving cable and a cable-engaging member, one of which is mounted under each car;

FIGURE 3 is a transverse, sectional view of a cable housing, showing the different levels of the cables and the cable-engaging means;

FIGURE 4 is a diagram illustrating changes in level of the track and driving cables as the track approaches a station;

FIGURE 5 is a diagram illustrating changes in level of track and driving cables as the track leaves a station;

FIGURE 6 is a transverse, sectional view of a cable and a cable-engaging means and showing the car-engaging projection and the manner of attaching it to the cable; and FIGURE 7 is an end view of a corner of a car, showing the track and one manner of stabilizing the car on the track.

The transportation system of the invention may be used for transporting material of any kind, but I have shown it as applied to passenger transportation. The system utilizes two common driving means for the cars, and a preferred driving means comprises two cables which are driven continuously at two different speeds. The high speed cable moves the cars at a high speed between stations, while the low speed cable moves the cars through the stations and at such a speed that passengers may enter or leave the cars while the cars are in motion.

A feature of the invention is the arrangement which utilizes the force of gravity for automatically shifting from the high speed drive to the low speed drive and vice versa. This is accomplished by having the stations at ground level and the intervening track sections below ground level, and guiding the cables to different levels at the proper time to permit the cars to engage them.

Referring now to the drawings, a length of track 1 is shown in FIGURE 1 with stations 2 connected by track sections 3 at lower levels. Cars 5 run on the track at spaced intervals, and the track sections 3 are sufficiently below ground to permit the cars to travel in a cut 4 or tunnel. This arrangement lends itself particularly to city transportation systems where the stations can be at street level and the track between the stations can be below the street, leaving the street available for other traffic.

The cars 5 may be any size, although small cars are preferably used, just large enough for two or four persons, and the cars are preferably provided with automatically opening and closing doors 6, so that as soon as a car reaches the speed of the low speed cable, the door will open to permit passengers to leave and enter while the car is in motion, and the door will close again while the car is still at the low speed. The mechanism for accomplishing this has not been shown, since it forms no part of the present invention.

Any type of track may be used to guide the cars, but for the purpose of this disclosure, I have merely shown channels 7 (FIGURE 7), in which the wheels 8 of the cars roll.

Two cables 10 and 11 (FIGURES 2, 3, 4, and 5), are provided to drive the cars. These cables run in a cable housing 12 which may be of suitable size to house the cables and the cable-guiding mechanism and is located beneath the center of the track. One form of mechanism for guiding the cables is shown in FIGURES 2, 3, and 6, and comprises a pair of opposed parallel channels for each cable. Thus, channels 13 and 14 are spaced at the sides of the cable 10 and channels 15 and 16 are spaced at the sides of the cable 11. These channels may be mounted at varying distances from the track level to change the distances of the cables from the track to shift the drive from one cable to the other, as will be explained. The channels 13 and 14 may be supported on suitable brackets 17, while the channels 15 and 16 may be supported on brackets 18. It will be understood, however, that, although the brackets 17 are shown with a greater height than the brackets 18 in FIGURES 2 and 3, the reverse will be true when the cable 11 is at a level above that of the cable 10, and the heights of the brackets will vary gradually at the crossing points.

A plurality of clamps 19 are attached to the cables at spaced intervals, as shown in FIGURES 2 to 6. Each of these clamps comprises a body member 20, adapted to fit on the under side of the cable, and a cooperating cover member 21, adapted to fit over the upper surface of the cable. Screws 22 are tightened to draw the two members 20 and 21 together to grip the cable securely between them.

The body member 20 is provided with bosses 23 at the sides thereof which support stub shafts 24 extending transversely of the cable and upon which small wheels 25 are roatably mounted. There are preferably two sets of these shafts, one set at the forward end of the body member and one set at the rear end, so that each clamp has four of the wheels 25, two at the front and two at the rear of the clamp.

The wheels 25 run in the channels 13 and 14, as will be seen from FIGURES 2, 3, and 6, so that the channels guide the cables and maintain them at the desired levels as they travel along under the track.

Each cover member 21 of the clamps 19 is provided with a projection 26 which extends upwardly towards the cars, and these projections are adapted to be engaged in a manner to be described by the cable-engaging means attached to the cars. The housing 12 is provided with flat cover plates 27 which provide longitudinal slots 28 and 29 immediately over the respective cables 10 and 11 and through which the projections 26 of a cable will extend when the cable is driving a car.

With this arrangement, the cables may be maintained at the desired level in spite of the tension thereon which may tend to raise them above the lower level positions. The cables are prevented from turning by the wheels 25 running in the channels 13 and 14 and by the projections 26 which are never withdrawn completely into the housing when the lowest level of the cable is reached.

When a projection 26, attached to a cable clamp, picks up the load of pulling a car, there will be a tendency for the cable to bend or kink where the projection is attached to it. In order to avoid such an undesirable effect, the clamps 19 are made of sufficient length so that the rear wheels 25 in the channels will maintain the cable against such movement.

As shown in FIGURE 3, the cable 10 may be the high speed cable and the cable 11 may be the low speed cable. At the point of the track where the section is taken, the track is passing through a station. At this point, the low speed cable 11 is at its upper level with the projections 26 thereon extending to their highest positions, while the high speed cable 10 is at the lowest level with the projections out of reach of the cable-engaging means of the cars.

Each car is provided with one or more cable-engaging means 30 which may comprise a bar 31 depending from the bottom of the car by means of arms 32 and 33 which are pivotally suspended from the bottom of the car. The arms are pivoted, as at 34, at the sides of a member 35 which is provided with a downwardly extending stop flange 36 which is towards the front of the car from the pivot points 34 and against which the arms 32 and 33 lie when they are in their vertical position which they would normally maintain by the effect of gravity. The arms 32 and 33 and the bar 31 can not therefore swing in the forward direction because of the flange 36, but they are free to swing towards the rear of the car. The bar 31 hangs down far enough to engage the projections 26 on one of the cables when it is in its uppermost position. If the car is moving faster than the cable, the bar 31 will strike a projection 26 and ride up over it as the arms swing towards the rear of the car. However, if the car is not moving faster than the cable, a projection 26 will engage the rear of the bar 31, and, since the arms cannot swing forward, the projection will force the bar forward and thus drive the car forward. The forward, lower edge of the bar 31 and the upper rear edge of each projection 26 may be rounded to facilitate the riding of the bar over the projections when the speed of the car exceeds that of the cable.

As has already been stated, the shift of the drive from one cable to the other is automatically produced under the influence of gravity. FIGURES 4 and 5 illustrate diagrammatically the change in elevation of the cables, although not necessarily to scale longitudinally. In FIGURE 4, the high speed cable 10 has been moving at a higher elevation than the low speed cable 11, and one of the projections 26 on the high speed cable has been driving the bar 31 of a car, as indicated at the left of the figure. As the car approaches a station, the track slopes upwardly. At the same time the high speed cable 10 rises more slowly than the track (or, if desired, does not rise at all), while the low speed cable 11 rises more rapidly, so that the cables cross with respect to their elevation. The projection 26 on the high speed cable which has been driving the car will fall beneath the bar 31, so as no longer to drive the car. Since the car is now going up grade, it will begin to slow down under the influence of gravity. However, it is still going faster than the low speed cable, and the bar 31 will ride over the projections 26 on the low speed cable when such projections are high enough to be encountered by the bar. But finally, because of the effect of gravity, the car will slow down to the speed of the low speed cable. At this point, one of the projections 26 on the low speed cable 11 will engage the bar 31 and drive the car at the low speed through the station area.

The opposite effect is produced when the car leaves the staiton area. FIGURE 5 illustrates diagrammatically the transfer from the low speed cable 11 to the high speed cable 10. The track 1 is shown sloping downwardly, away from the station area in the direction of the arrow. The bar 31 is shown at the left of the figure being driven by a projection 26 on the low speed cable 11. The high speed cable 10 is below the low speed cable 11 at the upper elevation. The crossing point occurs at a point down the slope of the track. As the car starts down the slope, gravity will cause it to pick up speed, whereupon the bar 31 will ride over its driving projection 26 on the low speed cable 11 and over successive preceding projections until the cable is low enough with respect to the bar 31, so that the bar avoids these projections completely. By this time the speed of the car has increased to approximately the speed of the high speed cable 10. But now the high speed cable has reached sufficient level with respect to the bar 31 so that one of the projections 26 on the high speed cable will contact the bar 31 and thereafter drive the bar and the car at the high speed.

It is necessary to adjust the angle of the slope and the crossing point of the cables so that the car, as accelerated by gravity, will reach the speed of the high speed cable at just about the time that the projections on the high speed cable will be high enough to engage the bar 31.

When the crossing points are properly positioned, there should be no sudden change in the speed of a car when the high speed cable takes up the load, so that no provision need be made to prevent a jolting action when the change-over takes place. However, it may be desired to insure against a shock when either cable takes up the load in driving a car. For this purpose, I mount the member 35 so that it is longitudinally movable with respect to the car body. To this end I provide a member 37 which is rigidly attached to the bottom of the car and in which the member 35 is slidably mounted longitudinally of the car. A heavy compression spring 38 is positioned between the member 35 and the forward end 39 of the member 37. This spring normally holds the member 35 with its depending arms 32 and 33 and the bar 31 towards the rear of the car. When one of the projections on a cable strikes the bar 31, the spring 38 can be compressed to absorb the impact, so that there will be no noticeable jar to the passengers in the car.

It may be desirable to provide automatic brakes on each car to prevent a car from travelling at too great a speed, or to prevent bunching of the cars on the track, or to prevent a car from bumping the car ahead. Such a braking arrangement is not shown, but one skilled in the art will understand how it may be applied.

It is also desirable to provide means for preventing the cars from being derailed. To this end I provide a flange 40 along each side of the cover 27 of the cable housing 12 and I provide each car with one or more pairs of wheels 41 which are mounted on vertical shafts 42 secured to the axle 43 which rotatably supports the car wheels 8. The wheels 41 of a pair run along opposite sides of the cable housing 12 under the flanges 40 and stabilize the movement of the car and prevent derailment thereof.

In the operation of the system, cars are positioned along the track at convenient distances apart sufficient to permit each car to slow down as it approaches a station without the car following overtaking it and to speed up as it leaves a station without striking the car ahead. A car will then move at the speed of the high speed cable 10 as its driving bar 31 is driven by one of the projections 26 on the high speed cable. As it approaches a station, the car will rise up the grade and at the same time the high speed cable 10 will drop below the bar 31. The car will then slow down by the action of gravity, as explained above.

The low speed cable 11 by this time has risen sufficiently so that the car will be driven at the speed of that cable by a projection 26 thereon engaging the bar 31. The car will now move at the speed of the low speed cable through the station and the doors will be automatically opened, in a manner not shown, so that the passengers may leave or enter the car while it is in motion. When the car reaches the end of the station platform, the doors will automatically close again and the car will start down the grade from the station, gathering speed as it goes. At first the bar 31 will ride over the projections 26 on the cable 11, but by this time the cable 11 has been lowered below the bar and the other cable 10 is rising to a position where one of its projections 26 will engage the bar and pick up the load of the car. The elevation of the high speed cable 10 with respect to the track may be adjusted so that the speed of the car will be just equal to that of the high speed cable when the contact between the projection 26 on that cable and the bar 31 is made. However, if the speed of the car should be slightly less than that of the cable, the shock of the engagement of the bar 31 with a faster moving projection 26 will be taken up by the spring 38, permitting the bar 31 and the bracket 35 which supports it to move forward with respect to the car while the car catches up to the cable. The car will then be driven at the high speed in the cut or tunnel 4 until it reaches the grade approaching the next station.

While cables have been shown as the driving means common to all the cars of the system, other driving means, such as belts or rotating screws may be used, while still utilizing the effect of gravity to effect the change from one speed to another. Also, although the guiding of the cables has been shown to be effected by wheels carried by the cables themselves and running in guiding channels, it will be evident that the cables may be guided by means of sheaves or pulleys rotatably mounted at fixed positions over which the cables run, or other guiding mechanisms may be used.

From the above it will be seen that I have provided a transportation system which is simple, relatively inexpensive to construct and maintain in operation, and which is particularly adapted for use in substantially flat areas, such as cities, or wherever it is desired to move people or things from place to place along a given route. The propelling mechanism operates continuously, and no complicated clutch devices are required to connect and disconnect a car to and from the driving mechanism, the connection and disconnection being effected by gravity in cooperation with the change of levels of the driving means.

Many modifications of what has been shown and described may be resorted to without departing from the spirit of the invention. I do not desire, therefore, to limit my invention to what has been shown and described, except by the limitations contained in the appended claims.

What I desire to claim and secure by Letters Patent is:

1. A transportation system comprising:
 (a) a plurality of stations arranged at spaced intervals;
 (b) a track following a predetermined path past said stations, said track having first sections extending from predetermined first points as the track approaches said stations to predetermined second points as the track leaves said stations and second sections extending respectively from said second points to said first points between said stations, said second sections being at a lower level than said first sections, said first sections including sloping portions joining said second sections;
 (c) a plurality of cars on track adapted for movement therealong, the sloping portions of each first section of said track at the approach to the associated station being at such an angle with the horizontal that a car will slow down under the influence of gravity as it approaches the station and the sloping portion of each first section of said track as the track leaves the station being at such an angle with the horizontal that a car leaving a station will speed up under the influence of gravity on said sloping portion;
 (d) first and second driving means, common to said cars, extending longitudinally beneath said track, said first means adapted to be driven at a predetermined low speed and said second means at a predetermined high speed;
 (e) engaging means on each car operative in a forward direction only for engaging said driving means to permit said cars to be moved forward by said driving means;
 (f) means for maintaining said first driving means out of engagement with said engaging means on a car which is travelling on one of said second sections of said track between stations and to maintain it in engagement with said engaging means when said car is travelling on one of said first sections of said track at said stations; and
 (g) means for maintaining said second driving means out of engagement with said engaging means on a car which is travelling on a first section of said track at a station and to maintain it in engagement with said engaging means on a car which is travelling on a second section of said track between stations.

2. A transportation system comprising:
 (a) a plurality of stations arranged at spaced intervals;
 (b) a track following a predetermined path past said stations, said track having first sections extending from predetermined first points as the track approaches said stations to predetermined second points as the track leaves said stations and second sections extending respectively from said second points to said first points between said stations, said second sections being at a lower level than said first sections, said first sections including sloping portions joining said sections together;
 (c) a plurality of cars on said track adapted for movement therealong, the sloping portion of each first section of said track at the approach to the associated station being at such an angle with the horizontal that a car will slow down under the influence of gravity as it approaches the station and the sloping portion of each first section of said track as the track leaves the station being at such an angle with the horizontal that a car leaving a station will speed up under the influence of gravity on said sloping portion;
 (d) first and second endless cables mounted for movement longitudinally of said track and adjacent thereto, said first cable adapted to be driven at a predetermined low speed and said second cable at a predetermined high speed;
 (e) cable-engaging means on each car operative in a forward direction only for engaging said cables to permit said cars to be moved forward by said cables;
 (f) means for guiding said first cable so as to maintain it out of engagement with said cable-engaging means on a car which is travelling on one of said second sections of said track between stations and to maintain it in engaging relation with said cable-engaging means when said car is travelling on one of said first sections of said track at said stations; and (g) means for guiding said second cable so as to maintain it out of engagement with said cable-engaging means on a car which is travelling on a first section of said track at a station and to maintain it in engaging relation with said cable-engaging means on a car which is travelling on a second section of said track between stations.

3. A transportation system, as defined in claim 2, in which each cable has a plurality of projections extending transversely of said cable in the direction of the cars and the cable-engaging means comprises a member attached to each car adapted to be engaged by said projections and means for causing said member to over-ride said projections when the car is moving faster than the cable but to be caught by a projection when the car slows down to the speed of said cable, whereby said cable propels said car.

4. A transportation system, as defined in claim 3, in which the stations are at ground level and the second sections of track between said stations are depressed sufficiently below ground level so that the cars moving at high speed will be below the surface of the ground.

5. A transportation system, as defined in claim 4, further comprising means for maintaining the cars on the track comprising:
(a) opposed stationary horizontal flanges extending along said track; and
(b) a pair of wheels transversely spaced on each car, mounted for rotation on vertical axes and adapted to run under said flanges.

6. A transportation system, as defined in claim 3, further comprising:
(a) a housing for the cables extending lengthwise along the center of the track and following the contours thereof;
(b) a substantially flat cover for said housing, said cover being provided with a pair of parallel slots, each wide enough for slidably accommodating the projections attached to the respective cables, the cable-guiding means being inside said housing and so arranged that each cable is beneath a slot and when a cable is in engagement with the cable-engaging means of a car, the projections on said cable extend through the associated slot, and when a cable is out of engagement with said cable-engaging means, it is guided so that said projections are withdrawn from said cable-engaging means.

7. A transportation system, as defined in claim 1, further comprising means for maintaining the cars on the track, said means comprising:
(a) opposed, stationary, horizontal flanges extending along said track; and
(b) a pair of wheels transversely spaced on each car, mounted for rotation on vertical axes, and adapted to run under said flanges.

8. A transportation system, as defined in claim 2, further comprising:
(a) a housing for the cables extending lengthwise of the track along the center thereof and following the contours thereof;

(b) a substantially flat cover for said housing, said cover being provided with a pair of parallel slots, each wide enough for slidably accommodating the projections attached to the respective cables, the cable-guiding means being inside said housing and so arranged that each cable is beneath a slot and when a cable is in engagement with the cable-engaging means of a car, the projections on said cable extend through the associated slot, and when a cable is out of engagement with said cable-engaging means, it is guided so that said projections are withdrawn from said cable-engaging means.

9. A transportation system, as defined in claim 2, in which the cables are mounted below the cars at the center of the tracks and are provided with a plurality of projections extending towards the cars, and the cable-engaging means on each car comprises:
(a) a bar extending transversely of said track;
(b) means comprising an arm at each end of said bar for pivotally suspending said bar below said car at a level to be engaged by the projections on said cables when said cables are in proper position; and
(c) means for preventing said arms and bar from swinging forwardly beyond the vertical while permitting said arms and bar to swing towards the rear so as to over-ride said projections on a cable when said car is moving faster than said cable.

10. A transportation system, as defined in claim 9, further comprising:
(a) a housing for the cables extending lengthwise along the center of the track following the contours thereof;
(b) a substantially flat cover for said housing, said cover being provided with a pair of parallel slots, each wide enough for slidably accommodating the projections attached to the respective cables, the cable-guiding means being inside said housing and so arranged that each cable is beneath its own slot and, when a cable is in engagement with the cable-engaging means of a car, the projections on said cable extend through the associated slot, and, when a cable is out of engagement with said cable-engaging means, it is guided so that said projections are withdrawn from said cable-engaging means.

11. A transportation system, as defined in claim 10, in which the cable guiding means for each cable comprises:
(a) a pair of opposed channels extending along the sides of said cable and adjacent thereto;
(b) a plurality of clamps attached to said cable at spaced intervals along said cable; and
(c) a wheel rotatably mounted at each side of each of said clamps and adapted to run in the channel on that side.

12. A transportation system, as defined in claim 11, in which the projections on said cables are attached to the clamps.

No references cited.

ARTHUR L. LA POINT, *Primary Examiner.*

D. F. WORTH, *Assistant Examiner.*